United States Patent
Gorius et al.

(10) Patent No.: US 8,660,764 B2
(45) Date of Patent: Feb. 25, 2014

(54) METHOD FOR ACTUATING A FRICTION CLUTCH

(75) Inventors: Thomas Gorius, Stuttgart (DE); Joerg Meissner, Bretzfeld (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 181 days.

(21) Appl. No.: 13/105,787

(22) Filed: May 11, 2011

(65) Prior Publication Data

US 2011/0278129 A1    Nov. 17, 2011

(30) Foreign Application Priority Data

May 12, 2010   (DE) .......................... 10 2010 021 000

(51) Int. Cl.
*G06F 7/00*   (2006.01)
(52) U.S. Cl.
USPC ................... 701/67; 701/51; 701/56; 701/95; 477/147; 477/180; 477/181
(58) Field of Classification Search
USPC ........... 701/51, 61, 67, 95; 477/147, 180, 181
See application file for complete search history.

(56) References Cited

U.S. PATENT DOCUMENTS

| | | | |
|---|---|---|---|
| 5,527,238 A * | 6/1996 | Hrovat et al. | 477/166 |
| 5,646,842 A * | 7/1997 | Schulz et al. | 701/51 |
| 5,910,175 A * | 6/1999 | Malson | 701/57 |
| 6,341,552 B1 | 1/2002 | Potter | |
| 6,594,573 B1 * | 7/2003 | Rossmann et al. | 701/67 |
| 7,077,783 B2 * | 7/2006 | Senger et al. | 477/98 |
| 7,356,400 B2 * | 4/2008 | Honma et al. | 701/67 |
| 8,204,669 B2 * | 6/2012 | Luders et al. | 701/90 |
| 8,480,540 B2 * | 7/2013 | Reibold | 477/180 |
| 2003/0134713 A1 * | 7/2003 | Senger et al. | 477/174 |

(Continued)

FOREIGN PATENT DOCUMENTS

| | | |
|---|---|---|
| DE | 10137581 | 8/2001 |
| DE | 10046106 | 4/2002 |

(Continued)

OTHER PUBLICATIONS

DE10046106C1—Machine Translation—Apr. 25, 2002.*

(Continued)

*Primary Examiner* — James Trammell
*Assistant Examiner* — Truc M Do
(74) *Attorney, Agent, or Firm* — Knobbe, Martens, Olson & Bear

(57) ABSTRACT

A method for actuating a friction clutch, in particular for a motor vehicle drivetrain. The friction clutch is acted on with a clutch pressure generated by a hydraulic actuator arrangement which has an electrically actuable fluid source and which has a hydraulic actuator whose state is characterized by an actuator actual value. The actuator actual value is related to the clutch pressure. The method has the steps: forming a regulation-oriented model of the actuator arrangement, which model has at least one fluid source actuating variable as an input and at least the actuator actual value as a flat output and which model can be inverted; forming an inverse model of the actuator arrangement; and inputting an actuator nominal value into the inverse model and using the model actuating variable which emerges therefrom for actuating the fluid source.

14 Claims, 3 Drawing Sheets

(56) References Cited

U.S. PATENT DOCUMENTS

| | | |
|---|---|---|
| 2003/0230461 A1 | 12/2003 | Sakata et al. |
| 2004/0074734 A1* | 4/2004 | Senger et al. ............. 192/109 F |
| 2006/0212204 A1* | 9/2006 | Honma et al. ................. 701/67 |
| 2007/0083315 A1* | 4/2007 | Takamatsu et al. ............ 701/90 |
| 2009/0228181 A1* | 9/2009 | Luders et al. .................. 701/67 |

FOREIGN PATENT DOCUMENTS

| | | | |
|---|---|---|---|
| DE | 10046106 C1 * | 4/2002 | |
| DE | 60304975 | 5/2007 | |
| DE | 102008009094 | 8/2009 | |

OTHER PUBLICATIONS

Horn, J., Flatness-based clutch control for automated manual transmissions, Control Engineering Practice, Bd. 11, Nr. 12 (2003).

European Search Report for Application No. 11164784.8, dated Oct. 6, 2011.

* cited by examiner $$\frac{\partial}{\partial t} X(t) = \begin{bmatrix} \dfrac{Kt\, I\_Mot - T_q(x_1, x_2)}{J\_tot} \\ \dfrac{Q\_Pump(x_1, x_2) - Q\_throttle(x_2) - Q\_line(x_2, x_3)}{E\_prime\,(=E1)} \\ \dfrac{B\_line\left(x_2 - \dfrac{F\_spring(x_3)}{A\_clutch}\right)}{A\_clutch} \end{bmatrix} \quad \begin{array}{l} \psi := x_1 \\ p\_line := x_2 \\ pos\_clutch\_m := x_3 \end{array}$$

$\swarrow 50$

Fig. 4

$$f\_x := \begin{bmatrix} \dfrac{Kt\, I\_Mot - T_q(x_1, x_2)}{J\_tot} \\ \dfrac{Q\_Pump(x_1, x_2) - Q\_throttle(x_2) - A\_clutch\, x_4}{E1} \\ x_4 \\ \dfrac{(x_2 - A\_clutch\, x_4\, B1)\, A\_clutch - F\_spring(x_3)}{mK\_1} \end{bmatrix} \quad \begin{array}{l} \psi := x_1 \\ p\_line := x_2 \\ pos\_clutch\_m := x_3 \\ v\_clutch := x_4 \end{array}$$

$\swarrow 50'$

Fig. 5

METHOD FOR ACTUATING A FRICTION CLUTCH

CROSS-REFERENCE TO RELATED APPLICATIONS

This application claims the priority of German patent application DE 10 2010 021 000, filed May 12, 2010.

BACKGROUND OF THE INVENTION

The present invention relates to a method for actuating a friction clutch, in particular for a vehicle drivetrain.

In motor vehicle drivetrains, friction clutches are often used as separating clutches between a drive unit and a transmission such as a multi-step transmission. The present invention relates in particular to this type of friction clutch, though may also relate to friction clutches such as synchronizing clutches in a transmission.

The progressive automation of motor vehicle drivetrains and the increased demands for fast gearshifts on the one hand and for high comfort on the other hand require sophisticated actuating methods.

It must be taken into consideration here that such friction clutches are often integrated into a transmission housing, and it is consequently difficult to measure certain states of the friction clutch.

Document DE 108 009 094 B4 discloses a method for actuating a clutch, wherein instead of a clutch pressure, a line pressure is measured at a measurement location connected via a transmission path to the hydraulic actuator for actuating the friction clutch, wherein the transmission path contains a hydraulic resistance. To improve the actuation of the friction clutch, it is proposed in said document to pass the measured actual signal through a transfer element with delay characteristics before said signal is transmitted to a regulator.

In said type of actuating method, it is consequently not necessary to measure the pressure in a hydraulic actuator.

Furthermore, the clutch position, which can be set equal to the position of a hydraulic actuator, is of particular significance from a regulation aspect. This is because, in the case of friction clutches of the type mentioned in the introduction, superordinate regulation strategies are often based on the so-called engagement point or kiss point, which corresponds to a position of the clutch or actuator at which the friction clutch begins "to grip". Here, the engagement point often corresponds to a state in which the friction clutch can transmit a certain very low torque.

The clutch position and the actuator position are however also variables which are difficult to measure.

Document DE 100 46 106 C1 discloses a method for regulating an automatic motor vehicle clutch, in which method the clutch position is measured and a regulating error is determined from a nominal value and from the measured actual value of the clutch position, and a regulating signal is calculated from said regulating error. In said document, to actuate a hydraulic actuator, an electrically actuable fluid source is used which has an electromagnetically actuated valve, by means of the coil current of which a volume flow of hydraulic fluid is controlled, wherein the volume flow builds up a pressure in the hydraulic actuator and thereby defines the position of the clutch. To compensate for non-linearities in the regulating path, a regulation-oriented model is established which is formed by the valve, the actuator and the clutch. An inverse path model is derived from said model. The volume flow is calculated by means of a sliding regulation algorithm. Said volume flow is input into the inverse path model and in this way the valve coil current required to generate the volume flow is calculated.

A similar method, in which an oil volume flow is calculated from a nominal position and an actual position and, in addition, a pilot controller calculates from the nominal position a further oil volume flow and outputs the latter as an output signal of the pilot controller, is known from DE 101 37 581 C1.

In the latter two documents, however, like before, it is assumed that the actual position of the clutch or an actual position of the actuator is measured and taken into consideration in the conventional way to form a regulating error.

BRIEF SUMMARY OF THE INVENTION

The present invention is based on the object of devising an actuating method for a friction clutch, in which method an actuator actual value such as an actuator or clutch position need not be measured.

The above object is achieved by means of a method for actuating a friction clutch, in particular for a motor vehicle drivetrain, the friction clutch being acted on with a clutch pressure generated by a hydraulic actuator arrangement which has an electrically actuable fluid source and which has a hydraulic actuator whose state is characterized by an actuator actual value which is related to the clutch pressure, the method having the steps:

forming a regulation-oriented model of the actuator arrangement, which model has at least one fluid source actuating variable as an input and at least the actuator actual value as a flat output and which model can be inverted;

forming an inverse (inverted) model of the actuator arrangement; and inputting an actuator nominal value into the inverse model and using the model actuating variable which emerges therefrom for actuating the fluid source.

A basic concept of the invention consequently consists in developing a regulation-oriented model which has a fluid source actuating variable as an input and the actuator actual value as a flat output, such that an actuator nominal value can be input into the inverse model in order to calculate therefrom a model actuating variable which is suitable for actuating the fluid source.

Accordingly, the measurement of an actuator position, for example, is not required. The object is thereby achieved in its entirety.

According to a preferred embodiment, the actuator actual value is accordingly an actuator position, and the actuator nominal value is an actuator nominal position.

It is also preferable for the model actuating variable which emerges from the inverse model to be used for pilot control.

In this way, the regulating stroke which must be processed by an associated regulator can be reduced.

Overall, it is also advantageous for the electrically actuable fluid source to be a pump which is controlled by means of an electric motor and whose fluid source actuating variable is the motor current.

It has been found that a fluid source of said type can firstly cover the required profiles with respect to time of the volume flow to be supplied to the hydraulic actuator. Secondly, the state of such a pump which is controlled by means of an electric motor can be well modelled and implemented in the regulation-oriented model.

According to a further preferred embodiment, the electrically actuable fluid source alternatively or additionally has an electrically controlled valve whose fluid source actuating variable is the valve current.

In said embodiment, the pump generates a relatively constant system pressure, from which the electrically controlled valve (for example an electromagnetically controlled valve) can then generate a suitable pressure and a suitable volume flow.

According to a further embodiment which is preferable overall, at least a part of the inverse model is used to determine from the actuator nominal value the model actuating variable, or a coupling variable which is coupled thereto, of the fluid source and to input said variable into a first regulator which from this and from a corresponding measured actual variable generates a first fluid source actuating variable.

In said embodiment, the model actuating variable or a coupling variable which is coupled thereto is measured and used for feedback regulation, such that stabilization is obtained.

Here, the measured variable is particularly preferably the rotational speed of the electric motor which drives a pump, since such a rotational speed can be determined in a simple and precise manner. Correspondingly, a model rotational speed of such an electric motor is preferably determined from the part of the inverse model.

In this way, the nominal state of the rotational speed of the electric motor is feedback-regulated.

In a further preferred embodiment, in a corresponding way, at least a part of the inverse model is used to determine from the actuator nominal value a model clutch pressure and to input the latter into a second regulator which from this and from a corresponding measured actual pressure variable generates a second fluid source actuating variable. Here, also this feedback regulation circuit serves for stabilization and for the compensation of model errors.

The first and/or the second fluid source actuating variable is then used preferably with the model actuating variable, which serves for pilot control and is derived from the inverse model, for actuating the fluid source, by virtue of the actuating variable(s) and the model actuating variable being added.

The measured actual pressure variable may be the pressure in the hydraulic actuator.

It is however particularly preferable for the measured actual pressure variable to be a line pressure at a measurement location between the fluid source and a hydraulic resistance between the fluid source and the actuator.

In said embodiment, pressure regulation can consequently take place on the basis of the measured pressure prevailing close to the fluid source. Accordingly, a relatively long hydraulic line may be situated between the measurement location and the hydraulic actuator, which line forms a hydraulic resistance. This simplifies the arrangement of the regulation-oriented and measurement-oriented components used for actuating the friction clutch.

In a first preferred embodiment, the regulation-oriented model is realized as a fourth order model with four state equations based on four state variables.

In this way, the model can describe the actuator arrangement with relatively high accuracy. Furthermore, it is possible here for the actuator actual value to be determined as a flat output, and such a model may be configured such that it can be inverted.

It is particularly preferable here for the four state variables to be a coupling variable of the fluid source (such as for example the rotational speed of the electric motor of a pump), the clutch pressure or the line pressure, an actuator value and a derivative of the actuator value.

With said state variables, it is possible to realize a regulation-oriented model of the actuator arrangement such that the formation of the inverse model is possible and the calculation of the model actuating variable does not require a high level of processing expenditure.

In a further preferred embodiment, the regulation-oriented model is realized as a third order model with three state equations based on three state variables.

The processing expenditure can be yet further reduced in this way.

It is particularly preferable here if the three state variables comprise a coupling variable of the fluid source (such as the rotational speed of an electric motor of a pump), the clutch pressure or line pressure and an actuator value.

In said embodiment, the regulation-oriented model is consequently realized without the use of a derivation of the actuator speed. In other words, an integration of the actuator acceleration, which involves a high level of regulation expenditure, is not required in said embodiment.

It is particularly preferable here for the actuator value to be an actuator position.

If, in the preferred variant, the derivative of the actuator speed (that is to say, the actuator acceleration) is not incorporated into the regulation-oriented model, the model can be used not only for the charging of the clutch but rather also for the actuation of the friction clutch in a regulation-oriented load situation. In other words, the actuation can take place over the entire working range of the friction clutch, since the speed of the actuator is not taken into consideration as a state. This is because, when the engagement point (kiss point) of the friction clutch is crossed, the rigidity of the system increases very significantly, since not only the restoring force of a restoring spring of the actuator acts as a restoring force, but rather also the internal friction clutch force (for example plate spring force). In this way, the frequencies of the model to be simulated become too large for a calculation in a transmission control unit if the actuator speed were incorporated as a system state.

Documents DE 100 46 106 C1 and DE 101 37 581 C1 disclose actuation methods which are suitable only for the charging process of the clutch, that is to say up to the engagement point.

Overall, the present invention relates to a regulation-oriented approach for the pilot control or regulation of the rotational speed, pressure and position of an actuator arrangement of a friction clutch in a vehicle based on the theory of "flatness-based follow-up regulation".

The actuation method according to the invention is suitable for the use of regulation-oriented models which can be used completely across all working points and which do not involve excessively high processing power. Furthermore, the regulation-oriented models may be realized such that they meet the requirements of theory for flat systems.

In other words, the present invention preferably achieves the object of realizing the pilot control and regulation of the position in the clutch, the pressure in the line and for example the rotational speed of a driving motor of a pump on the basis of physical, modelled relationships by means of the theory of "flat systems". Here, use is consequently preferably made of inverted models of the regulating path in order to calculate the required actuating current on the basis of a desired nominal position of the clutch. Furthermore, the desired nominal states of clutch pressure and/or line pressure and coupling value (rotational speed of the pump motor) are preferably determined on the basis of the model equations by means of predefined nominal profiles, and provided for feedback regulation for stabilization. The calculation of the nominal profiles, which are predefined preferably as nominal trajectories, takes place here preferably on the basis of a standardized setpoint which is varied in the vehicle on the basis of the present clutch position and time parameters. Here, the standardized nominal trajectories are subjected to boundary conditions such as for example continuous differentiability, specifically correspondingly to the selected order of the regulation-oriented model. In a further case, the calculation of the nominal trajectories may also take place by means of digital filters, the time constants and initial values likewise being determined on the basis of the present clutch position and time parameters.

Overall, the following should also be noted. The actuation method is based preferably on the following further conditions. The hydraulic line between the fluid source and the actuator should be a hydraulic line with laminar resistances. A capacitive characteristic should be generated in the line. In particular, the characteristic in the line should not be inductive. Furthermore, there may be a connection to a tank via a throttle or an orifice in order to increase the regulability of the system, because this then results in a low closed-loop gain with only slightly impaired efficiency.

Upon a start-up of the electric motor of the pump, compensation of the static friction may take place by virtue of the fluid source actuating variable being passed through a DT1 element.

Nominal trajectories which describe the nominal value profile of the system states are preferably input into the inverse model. Said nominal trajectories are generated preferably from the profile of the nominal position, wherein said profile should be four times continuously differentiable for a fourth order system. Furthermore, the start and end values should also be jointly representable. The nominal trajectories are therefore preferably described by means of a polynomial.

The dynamics of the nominal trajectories should be selected such that the fluid source actuating variable lies within predefined limits, that is to say is greater than zero and does not exceed a maximum fluid source actuating variable.

The first regulator and the second regulator for determining a first fluid source actuating variable and a second fluid source actuating variable are realized preferably as PI regulators.

As already mentioned above, the regulation-oriented stabilization of clutch or line pressure and/or coupling variables (rotational speed of the pump motor) is optional. It is also possible to improve the regulation by providing a regulation-oriented observer. For example, the coupling variable (rotational speed of the pump motor) may be provided to the regulator by a non-linear observer.

In particular in the embodiment with a third order model, there is an advantage in its usability over the entire working range, since the frequencies arising in the simulation are adequately small.

It is self-evident that the features mentioned above and those yet to be explained below may be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and will be explained in more detail in the following description, in which:

FIG. 4 shows a third order regulation-oriented model for use in an actuation method of the friction clutch;

FIG. 5 shows a fourth order regulation-oriented model for use in a method for actuating a friction clutch.

DETAILED DESCRIPTION OF THE INVENTION

Figure 1:
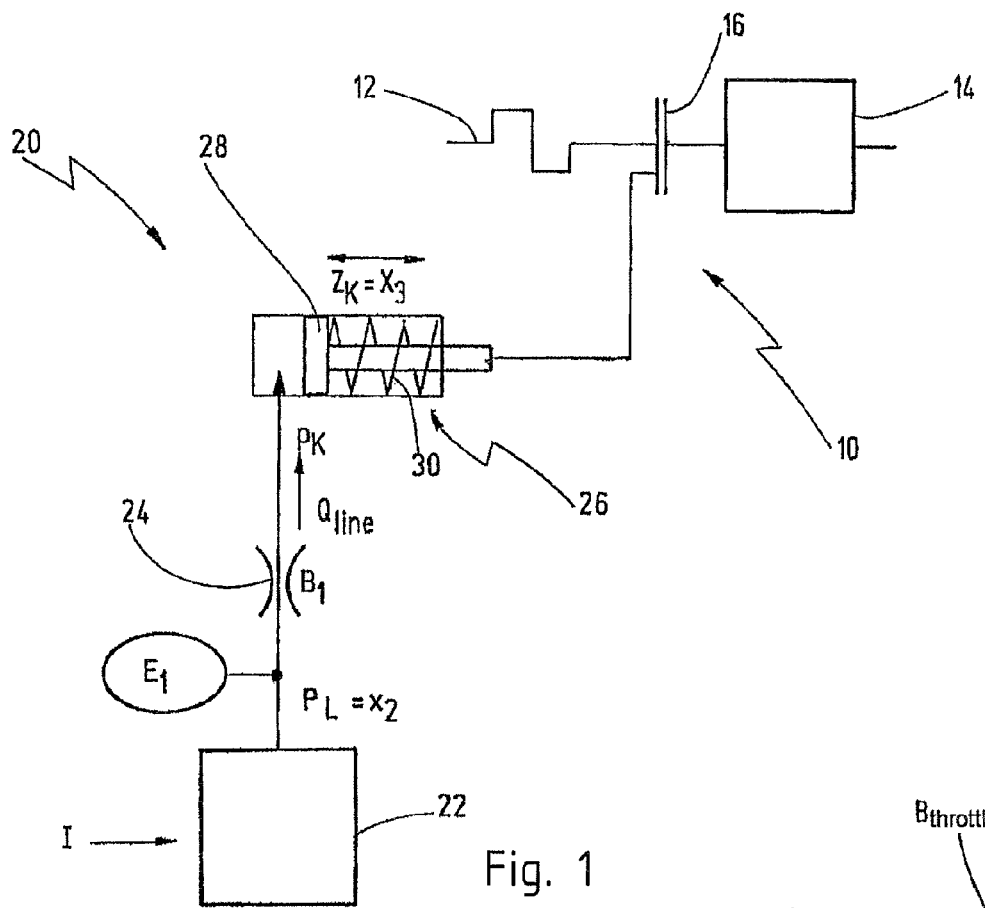
FIG. 1 shows a schematic illustration of a motor vehicle drivetrain having a hydraulic actuator arrangement for actuating a friction clutch.

A drivetrain for a motor vehicle is schematically illustrated and denoted generally by 10 in FIG. 1. The drivetrain 10 has a drive motor, which may be an internal combustion engine, a hybrid drive or the like, and a transmission 14, such as for example a multi-step transmission (for example an automated shift transmission or a double clutch transmission or else a torque converter transmission). A friction clutch 16 is arranged between the drive motor 12 and the transmission 14, which friction clutch 16 is designed in the present case as a starting and separating clutch. In the case of a double clutch transmission, the drivetrain may comprise two such friction clutches 16.

The present invention is however not restricted to use in conjunction with starting and separating clutches, but rather may for example also be applied to other types of friction clutches and/or brakes.

For the automatic actuation of the friction clutch 16, a hydraulic actuator arrangement 20 is provided. The actuator arrangement 20 has a fluid source 22 which can be electrically actuated, for example by means of an electrical current I. The fluid source 22 generates, at its outlet, a line pressure $p_L$ and a volume flow $Q_{Leitung}$. The fluid source 22 is connected via a hydraulic line section 24, which contains a hydraulic resistance B1, to a hydraulic actuator 26. The hydraulic actuator 26 is in the present case a single-acting piston/cylinder arrangement having a piston 28 and a restoring spring 30. The piston 28 is acted on with a piston pressure $p_K$ which, on account of the line section 24, is generally not identical to the line pressure $p_L$ in the transient state. To improve regulability, a discharge to a tank via a throttle and/or an orifice may take place between the fluid source 22 and clutch 16. The throttle or orifice is preferably arranged close to the fluid source, though may also be arranged remote therefrom.

The piston 28 is coupled to the friction clutch 16 and is designed to place the latter into engagement, for example by exerting pressure on plate packs or clutch discs. The friction clutch 16 may be a dry-running friction clutch or a wet-running friction clutch such as a multiplate clutch.

$E_1$ schematically denotes the pressure-dependent modulus of elasticity of the actuator arrangement 20.

During the actuation of the friction clutch, it is the travel $z_K(x_3)$ of the piston 28 that is taken into consideration. Said travel corresponds to the position or the travel of the friction clutch 16. The actuator arrangement 20 is actuated by means of an electrical variable, in the present case an electrical current I. If the current I is increased, a greater volume flow is provided by the fluid source 22, which leads to an increase of the line volume flow $Q_{Leitung}$, which ultimately leads to an increase of the piston pressure $p_K$ and consequently to a change in the position of the piston 28. This in turn leads to a movement of elements of the friction clutch 16. If the current I is reduced, the piston pressure $p_K$ falls and the piston 28 is retracted by the force of the restoring spring 30.

During the operation of the friction clutch 16, a so-called engagement point or kiss point is set which corresponds to a value of the piston travel $z_K$ at which the friction clutch 16 can transmit a very low torque. In the unpressurized state of the actuator 26, the friction clutch 16 is fully open. The travel from the fully open position of the friction clutch to the engagement point is referred to as "charging" the friction clutch 16. The regulation of the transmission of the torque by the friction clutch 16 takes place above the engagement point, wherein in said state, the movement of the piston 28 counteracts not only the force of the restoring spring 30 but rather also the internal pressure force of the friction clutch 16.

Figure 2:
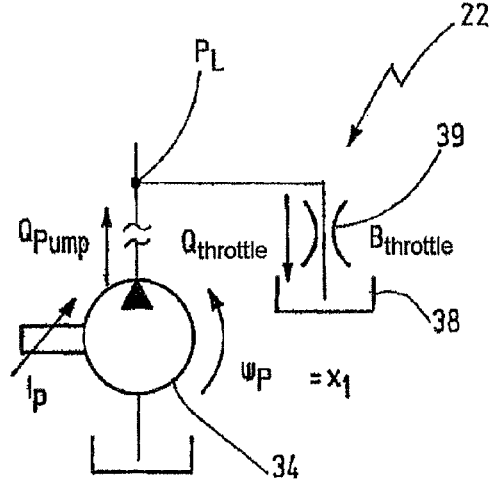
FIG. 2 shows an embodiment of a fluid source for the actuator arrangement of FIG. 1.

FIG. 2 illustrates a first embodiment of a fluid source 22. The fluid source 22 of FIG. 2 has a pump 34 which is driven by an electric motor and which sucks hydraulic fluid from a tank and delivers a volume flow $Q_{pump}$. The electric motor which drives the pump 34 is driven by means of an electrical current $I_P$. The rotational speed of the electric motor is denoted by $\omega_P(x_1)$.

To improve regulability after the engagement point (kiss point) is reached, a part of the volume flow $Q_{pump}$ delivered by the pump 34 is discharged via a throttle 36 into the tank 38. The throttle 36 has a hydraulic resistance $B_{Drossel}$. A volume flow $Q_{Drossel}$ flows through the throttle 36. The volume flow $Q_{Leitung}$ is consequently defined as the difference $Q_{pump} - Q_{Drossel}$. The throttle may also be arranged at some other location between the pump and friction clutch, for example downstream of the hydraulic resistance; in this case, the above volume balance equation must be adapted correspondingly.

Figure 3:
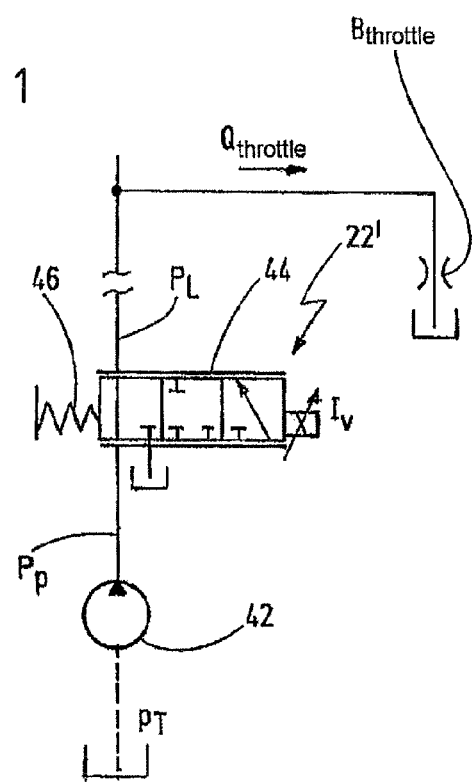
FIG. 3 shows an alternative fluid source for the actuator arrangement of FIG. 1.

FIG. 3 illustrates an alternative embodiment of a fluid source 22'. The fluid source 22' has a pump 42 which generates a pump pressure $P_P$ at its outlet. Furthermore, the fluid source 22' has an electrically actuable valve 44. The valve 44 is for example a directional valve or a proportional valve and can for example be electromagnetically actuated, by means of a current $I_V$. Here, a valve piston may be preloaded into a basic position shown in FIG. 3 by means of a restoring spring 46.

A method for actuating the actuator arrangement 20 and therefore the friction clutch 16 will be described below, which method is based on the fluid pump 22 of FIG. 2. A corresponding adaptation of the algorithms described below on the basis of the fluid source 22' of FIG. 3 is however also possible.

During the actuation or regulation of the actuator arrangement 20 and therefore of the friction clutch 16, the states of the hydraulic actuator 26 which have a direct effect on the friction clutch 16, specifically the piston pressure $p_K$ and the piston position $z_K$, cannot be directly measured. In other words, it is sought here to develop an actuating method in which it is not necessary to measure said states directly.

To nevertheless permit precise actuation, it is necessary to develop for the actuator arrangement 20 model equations which permit a direct inference of the non-measurable states. Here, the following states are taken into consideration for the model development:

a) the rotational speed of the electric motor driving the pump 34: $\omega(x_1)$
b) the pressure of the fluid in the line between the fluid source 22 and the line section 24: $P_L$ (p_Leitung; $x_2$)
c) the position of the clutch: $Z_K$ (pos_Kupp_m; $x_3$)

For the rotational speed $\omega$, the following differential equation can be established according to the law of conservation of angular momentum:

$$\frac{\delta}{\delta t}\omega(t) = \frac{KtI\_Mot - T\_RD - Tq\_Pump}{J\_tot} \quad (1)$$

Here, the friction and damping forces can be combined in a common measured characteristic map, and on account of the relationship between damping and resistance and also on account of the increasing resistance with increasing rotational speed of the pump, can be neglected, which has a stabilizing effect. The resulting state equation is consequently $$\frac{\delta}{\delta t}\omega(t) = \frac{KtI\_Mot - Tq\_Pump}{J\_tot} \quad (2)$$

where
Kt Torque constant of the electric motor
I_Mot Motor current=$I_P$
$T_q$_Pump (=$T_q$) Resistance torque of the pump
J_tot Total inertia coupled to the motor The resistance torque $T_q$_pump is obtained, in the case of a pump of the type in question, from a resistance characteristic map, as mentioned above. Said characteristic map is in the present case preferably reduced to a characteristic curve, with preferably only a certain section of the characteristic map being considered. Such a section may then be linearized without a great loss in accuracy, such that the resistance torque can be represented by $$T_q\_pump := ctq1\omega + ctq2 \quad (3)$$

where
ctq1 Equation gradient
ctq2 Resistance torque at rotational speed $\omega = 0$ For the line pressure $p_{Leitung}$, the following differential equation can be established:

$$\frac{\delta}{\delta t}p\_Leitung(t) = \frac{Q\_pump - Q\_Drossel - Q\_Leitung}{E1} \quad (4)$$

The position of the piston and therefore of the clutch is calculated by integrating the speed. The speed itself is calculated not by integration but rather by the relationship according to equation (5) below. This has the advantage that the frequency of the calculation of the speed does not become too high even in the region beyond the engagement point. Consequently, holistic actuation of the friction clutch beyond the engagement point is possible.

Assuming that the speed of the clutch v_Kupp emerges from the quotient of the volume flow in the line Q_Leitung and the effective hydraulic surface area of the piston, and under the further assumption that the volume flow in the line Q_Leitung emerges to B_Leitung (p_Leitung−p_Kupplung), and under the further assumption that the pressure p_Kupplung emerges from the quotient of the spring force F_Fed ($x_3$), which is dependent on the clutch travel, and the surface area of the piston A_Kupp, the following state equation can be established:

$$v\_Kupp := \frac{B\_Leitung\left(x_2 - \frac{F\_Fed(x_3)}{A\_Kupp}\right)}{A\_Kupp} \quad (5)$$

where
- v_Kupp: speed of the piston 28
- B_Leitung: hydraulic resistance $B_1$ of the line section 24
- F_Fed($x_3$): restoring force of the piston, which is dependent on the piston position and the spring constant of the restoring spring 30 and also includes restoring forces as a result of the friction pair contact of the friction clutch
- A_Kupp: effective hydraulic surface area of the piston 28.

On the basis of the above differential equations, it is possible to form a model 50 of the actuator arrangement 20 as shown in FIG. 4. The selected model for the actuator arrangement 20 has the advantage that the clutch position $x_3$ exists as a flat output of the model.

In other words, all state and input variables can be described completely on the basis of said flat output and a finite number of derivatives thereof with respect to time. Here, the motor current I_mot is used as an input for the model.

The model which is described above and shown at 50 in FIG. 4 can furthermore be inverted. The output of the inverse model is consequently the motor current $I_P$(I_mot).

Nominal trajectories are input into the inverted model. The nominal trajectories are calculated on the basis of the specification of a superordinate controller, which specifies for example that a certain clutch position must be reached within a certain time. The nominal trajectories consequently describe the nominal value profile of the system states and are generated from the profile of the nominal position by differentiation. Said profile must be at least three times continuously differentiable, because the model 50 is a third order model.

Such nominal trajectories may consequently be realized by means of a corresponding order polynomial or by means of a filter of corresponding order. If a polynomial is used and the start and end values of the individual states are also taken into consideration, the order of the polynomial is increased to seven. Here, the dynamics should be selected such that the actuating variable which emerges from the inverse model lies within predefined limits ($0 < I < I_{max}$).

It is alternatively possible for a model 50' designed as a fourth order model to be developed for the actuator arrangement. Here, aside from the three states of the model 50 of FIG. 4, a fourth state is also included which represents the speed of the clutch (v_Kupp; $x_4$).

The model 50' of FIG. 5 incorporates substantially the same parameters as the model 50 of FIG. 4, wherein Q_pump ($x_1$, $x_2$) is the volume flow of the pump, which is dependent on the rotational speed of the pump motor and the pressure in the line, and wherein $E1 = E\_Strich$ (equivalent bulk modulus), c0, c1 are spring constants of the restoring force of the spring(s) in the region before and/or beyond the engagement point, mK_1 is the mass of the clutch piston.

The model 50' is a fourth order model, such that the profile of the nominal position must be four times continuously differentiable in order to determine the nominal trajectories. This results in a ninth order solution polynomial for the nominal trajectories.

Figure 6:
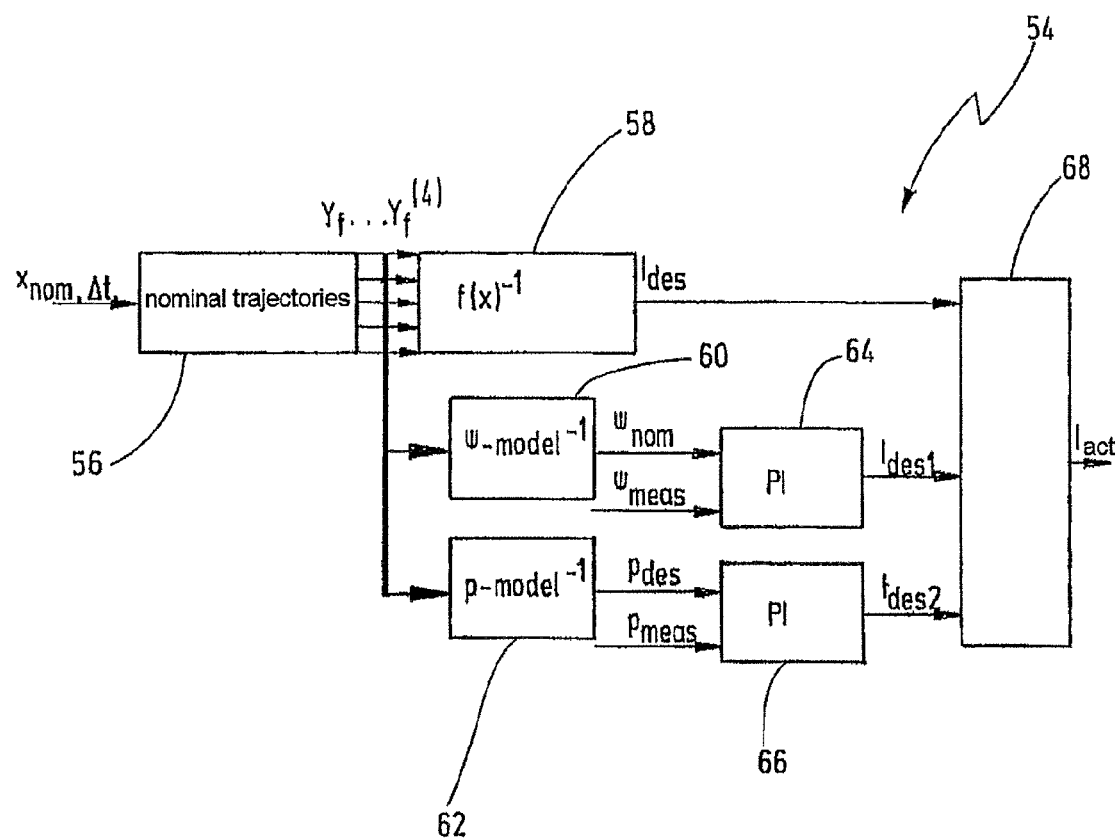
FIG. 6 shows a schematic illustration of a regulating circuit for the actuator arrangement.

FIG. 6 illustrates a regulating circuit 54 in schematic form. The regulating circuit 54 comprises a module 56 for determining the nominal trajectories, wherein the number of derivatives is in the present case indicated as four, but may also be three. Shown at 58 is an inverse model of the model 50 (or 50'), into which inverse model the nominal trajectories are input and which inverse model has, as an output $I_{des}$, a pilot control value for the pump motor current I. In other words, the inverse model 58 is used for pilot control.

Shown at 60 is a model part of the inverse model 58, by means of which model part a nominal value for the pump rotational speed ($\omega_{Soll}$) can be determined from the nominal trajectories. In a first regulator 64, which may be designed as a PI regulator, said model nominal value is compared with a measured actual value of the pump motor rotational speed $\omega_{mess}$ and, from this, a first actuating variable $I_{des1}$ is calculated.

In a corresponding way, a second model part 62 of the inverse model 58 is used to determine a nominal variable for the line pressure ($p_{des}$). Said model nominal variable and a measured actual value of the line pressure ($p_{mess}$) are input into a second regulator 66 which, from these, generates a second actuating variable $I_{des2}$.

In a summing module, the actuating variable $I_{des}$ of the pilot control and the actuating variables $I_{des1}$ and $I_{des2}$ are added up to form a total actuating value $I_{Stell}$ which is input to the pump motor actuating current $I_P$. If appropriate, the summing module 68 may be followed by another current regulating circuit subordinate to the regulating circuit 54.

The invention claimed is:

1. Method for actuating a friction clutch, the method having the steps:
    forming on a regulation circuit a regulation-oriented model of a hydraulic actuator arrangement that generates a clutch pressure that acts on the friction clutch, wherein the hydraulic actuator arrangement comprises an electrically actuable fluid source and a hydraulic actuator whose state is characterized by an actuator actual value which is related to the clutch pressure, which model has at least one fluid source actuating variable as an input and at least the actuator actual value as a flat output and which model can be inverted;
    forming an inverse model of the actuator arrangement; and
    inputting an actuator nominal value into the inverse model and using a model actuating variable which emerges therefrom for actuating the fluid source;
    wherein at least a part of the inverse model is used to determine from the actuator nominal value a model clutch pressure and to input the latter into a first regulator which from this and from a corresponding measured actual pressure variable generates a first fluid source actuating variable, wherein the first fluid source actuating variable is used together with the model actuating variable for actuating the fluid source.

2. Method according to claim 1, the actuator actual value being an actuator actual position, and the actuator nominal value being an actuator nominal position.

3. Method according to claim 1, the model actuating variable being used for pilot control.

4. Method according to claim 1, the electrically actuable fluid source being a pump which is controlled by means of an electric motor having a motor current and whose fluid source actuating variable is the motor current.

5. Method according to claim 1, the electrically actuable fluid source being an electrically controlled valve having a valve current whose fluid source actuating variable is the valve current.

6. Method according to claim 1, at least a part of the inverse model being used to determine from the actuator nominal value the model actuating variable, or a coupling variable which is coupled thereto, of the fluid source and to input said variable into a second regulator which from this and from a corresponding measured actual variable generates a second fluid source actuating variable.

7. Method according to claim 1, the measured actual pressure variable being a line pressure at a measurement location between the fluid source and a hydraulic resistance between the fluid source and the actuator.

8. Method for actuating a friction clutch, the method having the steps:
- forming on a regulation circuit a regulation-oriented model of a hydraulic actuator arrangement that generates a clutch pressure that acts on the friction clutch, wherein the hydraulic actuator arrangement comprises an electrically actuable fluid source and a hydraulic actuator whose state is characterized by an actuator actual value which is related to the clutch pressure, which model has at least one fluid source actuating variable as an input and at least the actuator actual value as a flat output and which model can be inverted;
- forming an inverse model of the actuator arrangement; and
- inputting an actuator nominal value into the inverse model and using a model actuating variable which emerges therefrom for actuating the fluid source;
- wherein the regulation-oriented model being realized as a 4th order model with four state equations based on four state variables.

9. Method according to claim 8, the four state variables being a coupling variable of the fluid source, the clutch pressure, an actuator value and a derivative of the actuator value.

10. Method according to claim 1, the regulation-oriented model being realized as a 3rd order model with three state equations based on three state variables.

11. Method according to claim 10, the three state variables comprising a coupling variable of the fluid source, the clutch pressure and an actuator value.

12. Method according to claim 9, the actuator value being an actuator position.

13. Method according to claim 8, the electrically actuable fluid source having a pump which is controlled by means of an electric motor having a motor current and whose fluid source actuating variable is the motor current, and at least one of the state equations being based on a linearized section of a characteristic curve determined from a resistance characteristic map of the pump.

14. Method according to claim 6, wherein the first and the second fluid source actuating variables and the model actuating variables are added up to a total actuating value which is used for actuating the fluid source.

* * * * *